(No Model.)
T. C. GUILLARD & V. E. CATHERINET.
FINGER EXERCISING DEVICE.
No. 486,546. Patented Nov. 22, 1892.
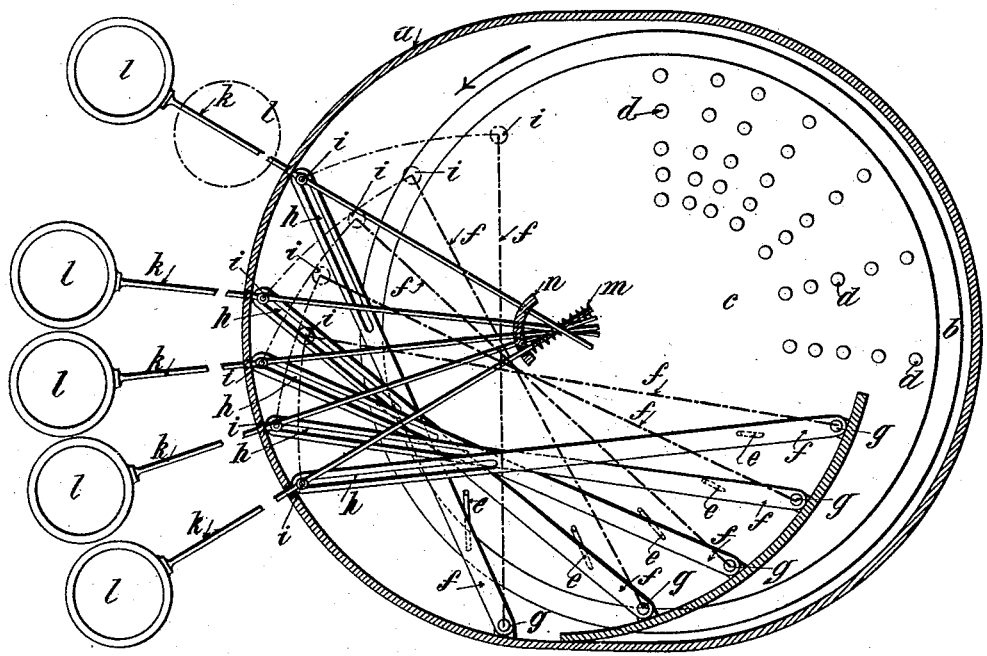
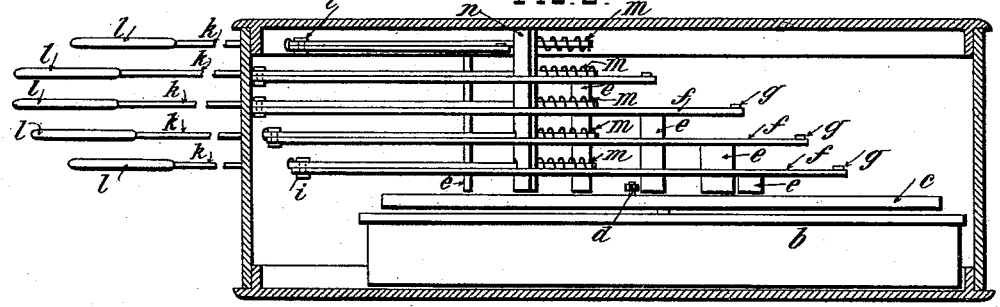
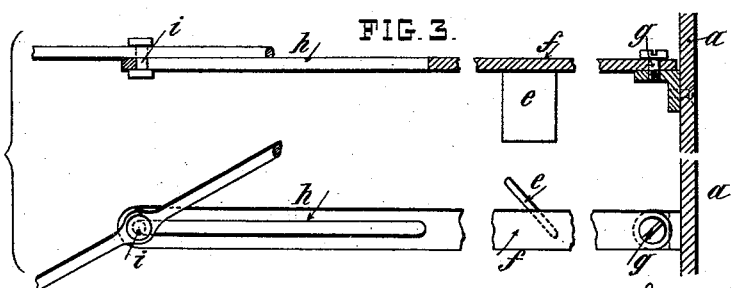

UNITED STATES PATENT OFFICE.

THÉOLINE CHARLOTTE GUILLARD AND VICTOR EUGÈNE CATHERINET, OF SAINT-MANDÉ, NEAR PARIS, FRANCE.

FINGER-EXERCISING DEVICE.

SPECIFICATION forming part of Letters Patent No. 486,546, dated November 22, 1892.

Application filed August 3, 1892. Serial No. 442,070. (No model.)

*To all whom it may concern:*

Be it known that we, THÉOLINE CHARLOTTE GUILLARD and VICTOR EUGÈNE CATHERINET, both of the city of Saint-Mandé, near Paris, France, have invented an Improved Apparatus for Exercising and Rendering Supple the Finger-Joints, of which the following is a full, clear, and exact description.

This invention relates to apparatus for mechanically exercising the finger-joints with a view to render the same supple in order to facilitate the playing of musical instruments or to remedy the effects of corporal affections by which the movements of the fingers may be paralyzed or impeded.

Reference is to be had to the accompanying drawings, forming part of this specification, wherein—

Figure 1 represents in horizontal sectional plan view an example of the apparatus, drawn to an enlarged scale. Fig. 2 is a vertical section of the same; and Fig. 3 represents in part sectional elevation and plan one of the actuating-levers, drawn to a larger scale.

The same letters of reference indicate the same parts in all the figures.

The apparatus by which to and fro movements are imparted to the fingers of either hand, so as to flex the fingers alternately or consecutively for two or more fingers or otherwise in any order desired, comprises a box-casing $a$, preferably of oval form, containing mechanism consisting of a spring-barrel $b$, actuating a circular pin-plate $c$, provided with pins $d$, which by acting on inclined tappets $e$ effects the oscillation of a series of levers $f$ about their respective centers of motion $g$. Each lever $f$ has a longitudinal slot $h$, in which is engaged a stud $i$, affixed to a corresponding rod $k$, adapted to slide through a hole in the side of the casing $a$ and terminating externally in a finger-ring $l$, the inner end of each rod sliding, also, through a guide $n$ and having applied to it a spring $m$, which tends to slide the rod $k$ in the opposite direction to that in which it is slid by the contact of one of the pins $d$ with the tappet $e$ on the corresponding lever $f$. The range of motion of the levers $f$ is indicated in figure by the radii and arcs shown in dotted lines, and the corresponding motion of one of the finger-rings is similarly indicated.

The operation of the apparatus is as follows: The spring-barrel $b$ rotates the disk $c$, whereof the pins $d$ come in contact with the tappets $e$, fixed obliquely to the levers $f$. These levers in oscillating about their axes $g$ draw inward the rods $k$ and the rings $l$, in which the fingers have been inserted, so as to cause the fingers to be flexed toward the casing $a$. When the pins $d$ escape from the tappets $e$, the rods and levers are returned to their initial position and the fingers are straightened by the action of the springs $m$. The positions of the pins $d$ upon the disk $e$ are dependent on the number, sequence, and intervals of the movements to be imparted, and by suitably arranging the pins the succession of movements of the different fingers may be varied indefinitely and may be made to agree, for example, with the exercises practiced by pianists and other instrumentalists.

The apparatus may be placed above or within the grasp of the hand and may be attached thereto by straps or other means. It will be obvious that the form and dimensions of the apparatus may be varied without in any way departing from the invention.

We claim—

The herein-described apparatus for mechanically exercising and rendering supple the finger-joints, consisting in the combination of the sliding rods $k$, carrying finger-rings $l$, with levers $f$, provided with tappets $e$ and with a pin-disk rotated by a motor $b$ and provided with pins $d$, acting on said tappets and arranged in any desired order so as to impart to and fro movements to the levers and finger-ring rods alternately or simultaneously, substantially as and for the purpose specified.

The foregoing specification of our improved apparatus for exercising and rendering supple the finger-joints signed by us this 16th day of July, 1892.

THÉOLINE CHARLOTTE GUILLARD.
VICTOR EUGÈNE CATHERINET.

Witnesses:
R. M. HOOPER,
ALBERT MOREANE.